(12) United States Patent
Elliott et al.

(10) Patent No.: US 8,167,557 B2
(45) Date of Patent: May 1, 2012

(54) GAS TURBINE ENGINE ASSEMBLIES WITH VORTEX SUPPRESSION AND COOLING FILM REPLENISHMENT

(75) Inventors: Tom Elliott, Chandler, AZ (US); Greg Heitland, Mesa, AZ (US); Jeff Howe, Chandler, AZ (US); Mark C. Morris, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 935 days.

(21) Appl. No.: 12/187,791

(22) Filed: Aug. 7, 2008

(65) Prior Publication Data

US 2010/0034663 A1    Feb. 11, 2010

(51) Int. Cl.
*F01D 5/18* (2006.01)
(52) U.S. Cl. ....... 416/97 R; 416/92; 416/96 R; 416/235; 415/17; 415/115; 415/119; 415/191
(58) Field of Classification Search .................... 415/15, 415/115, 119, 191–192, 209.04; 416/235, 416/97 R, 72, 96 R
See application file for complete search history.

(56) References Cited

U.S. PATENT DOCUMENTS

| | | | |
|---|---|---|---|
| 5,813,835 A | 9/1998 | Corsmeier et al. | |
| 7,217,094 B2 | 5/2007 | Cunha et al. | |
| 7,220,103 B2 | 5/2007 | Cunha et al. | |
| 7,249,933 B2 | 7/2007 | Lee et al. | |
| 2006/0140768 A1* | 6/2006 | Tam et al. | 416/193 A |
| 2006/0153681 A1* | 7/2006 | Lee et al. | 416/97 R |

* cited by examiner

*Primary Examiner* — Dung A. Le
(74) *Attorney, Agent, or Firm* — Ingrassia Fisher & Lorenz, P.C.

(57) ABSTRACT

A gas turbine engine assembly has combustion gases flowing through a gas flow path. The gas turbine engine assembly includes a stator assembly comprising a stator vane that extends into the gas flow path; and a turbine rotor assembly downstream of the stator assembly and comprising a turbine platform and a turbine rotor blade extending from the turbine platform into the mainstream combustion gases flow path. The turbine rotor blade includes a pressure side and a suction side opposing the pressure side that extend from a leading edge to a trailing edge. The combustion gases form horseshoe vortices at a formation area adjacent the leading edge of the turbine rotor blade, and the turbine rotor assembly further includes a first set of holes in the turbine platform for directing first jets into the formation area of the horseshoe vortices.

18 Claims, 3 Drawing Sheets

GAS TURBINE ENGINE ASSEMBLIES WITH VORTEX SUPPRESSION AND COOLING FILM REPLENISHMENT

TECHNICAL FIELD

The present invention generally relates to gas turbine engine assemblies, and more particularly relates to gas turbine engine assemblies with improved vortex suppression and cooling film replenishment.

BACKGROUND

Gas turbine engines are generally known in the art and used in a wide range of applications, such as aircraft engines and auxiliary power units for aircraft. In a typical configuration, turbine engines include rows of stator vanes and rotor blades disposed in an alternating sequence along the axial length of a generally annular hot gas flow path. The rotor blades are mounted on rotor platforms at the periphery of one or more platforms of rotor disks that are coupled in turn to a main engine shaft. Hot combustion gases are delivered from an engine combustor to the annular hot gas flow path, thus resulting in rotary driving of the rotor disks to provide an engine output.

The stator vanes and rotor blades typically have arcuate airfoil shapes with generally concave pressure sides and generally convex suction sides extending axially in chords between opposite leading and trailing edges. During operation, the aerodynamic contours of the stator vanes and rotor blades, and corresponding flow passages therebetween, are configured in an attempt to maximize energy extraction from the combustion gases. The complex three-dimensional (3D) configuration of the stator vanes and rotor blades varies radially in span along the airfoils as well as axially along the chords of the airfoils between the leading and trailing edges. As such, the velocity and pressure distributions of the combustion gases over the various surfaces, as well as within the corresponding flow passages, can vary.

Undesirable pressure losses in the combustion gas flow paths correspond with undesirable reduction in overall turbine efficiency. One common source of turbine pressure losses is the formation of horseshoe vortices generated as the combustion gases are split in their travel around the leading edges of the rotor blades. Particularly, a pair of counterrotating passage vortices are formed at the leading edge of the rotor blades. These vortices travel along the opposite pressure and suction sides of each rotor blade and behave differently due to the different pressure and velocity distributions therealong. For example, computational analysis indicates and flow testing supports that the pressure side vortex migrates away from the endwall toward the trailing edge and then interacts with the suction side vortex flowing aft thereto. The interaction of the pressure and suction side vortices occurs near the midspan region of the airfoils and may create total pressure loss and a corresponding reduction in turbine efficiency. As the pressure side vortex breaks away from the rotor blade, a corner vortex also develops. These corner vortices, as well as the passage vortices, can disrupt film cooling air along the platform surface, and reduce the cooling effectiveness thereof. More film cooling holes may therefore be required to improve cooling performance, which in turn increases cooling air requirements and decreases turbine efficiency.

Indeed, from the viewpoint of efficiency, it is desirable to operate the turbine at temperatures as high as possible. As a practical matter, however, the complexity of the vortices complicates the mechanisms for cooling the components, particularly the rotor platform. Thus, in order to economically produce turbines capable of sustained high temperature operation, other schemes to increase cooling effectiveness and efficiency are necessary.

Accordingly, it is desirable to provide an improved gas turbine engine assembly that suppresses vortex formation that may otherwise lead to reduced efficiency. In addition, it is desirable to provide an improved gas turbine engine assembly that replenishes any cooling film that has been disrupted as a result of these vortices. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a gas turbine engine assembly has combustion gases flowing through a gas flow path. The gas turbine engine assembly includes a stator assembly comprising a stator vane that extends into the gas flow path; and a turbine rotor assembly downstream of the stator assembly and comprising a turbine platform and a turbine rotor blade extending from the turbine platform into the mainstream combustion gases flow path. The turbine rotor blade includes a pressure side and a suction side opposing the pressure side that extend from a leading edge to a trailing edge. The combustion gases form horseshoe vortices at a formation area adjacent the leading edge of the turbine rotor blade, and the turbine rotor assembly further includes a first set of holes in the turbine platform for directing first jets into the formation area of the horseshoe vortices.

In accordance with another exemplary embodiment, a gas turbine engine assembly has combustion gases flowing through a gas flow path. The gas turbine engine assembly includes a stator assembly having a stator vane that extends into a mainstream combustion gases flow path; and a turbine rotor assembly downstream of the stator assembly and comprising a turbine platform and a turbine rotor blade extending from the turbine platform into the mainstream combustion gases flow path. The turbine rotor blade includes a pressure side and a suction side opposing the pressure side that extend from a leading edge to a trailing edge. The combustion gases form horseshoe vortices at a formation area adjacent the leading edge of the turbine blade and a corner vortex along the pressure side of the rotor blade, and the turbine rotor assembly includes a first set of holes positioned on the pressure side of the rotor blade configured such that first jets of cooling air flow onto the turbine platform.

In accordance with yet another exemplary embodiment, a method of suppressing the effects of vortices in a gas turbine engine assembly includes directing combustion gases through a gas turbine engine with a turbine rotor blade having a leading edge; and directing first jets toward the leading edge of the turbine rotor blade to thereby suppress formation of horseshoe vortices.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engine assemblies that reduce or eliminate of the effects of vortices formed as combustion gases flow around turbine rotor blades. More particularly, exemplary gas turbine engine assemblies include vortex suppression holes at a leading edge of the turbine rotor blades for suppressing or inhibiting vortex formation, and platform cooling replenishment holes on the pressure sides of the turbine rotor blades for providing cooling films on the platforms. The gas turbine engine assemblies produced according to exemplary embodiments may find beneficial use in many industries including aerospace, but also including industrial applications such as electricity generation, naval propulsion, pumping sets for gas and oil transmission, aircraft propulsion, automobile engines, and/or stationary power plants.

Figure 1:
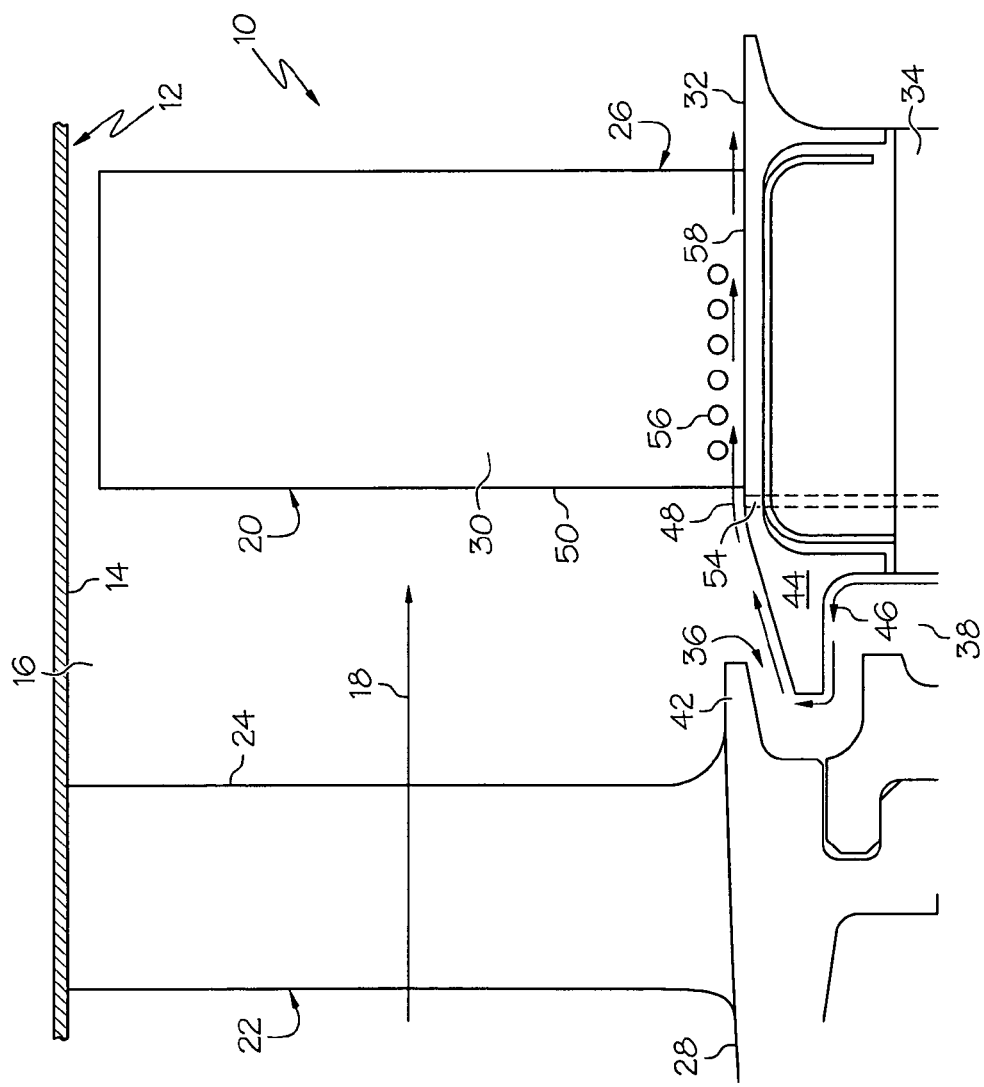
FIG. 1 is a partial cross-sectional view of a gas turbine engine assembly in accordance with an exemplary embodiment.

FIG. 1 is a fragmented vertical sectional view illustrating a portion of a gas turbine engine assembly 10 in accordance with an exemplary embodiment. The gas turbine engine assembly 10 has an overall construction and operation that is generally known to and understood by persons skilled in the art. In general terms, the gas turbine engine assembly 10 has a housing 12 with an annular duct wall 14 that defines a mainstream hot gas flow path 16 for receiving a flow of mainstream combustion gases 18 from an engine combustor (not shown). The housing 12 additionally houses at least one stator assembly 22 with stator vanes 24 and at least one turbine rotor assembly 26 with turbine rotor blades 20. The combustion gases 18 flow past axially spaced circumferential rows of stator vanes 24 and rotor blades 20, which are appropriately formed from suitable material capable of withstanding the high temperature environment.

In the embodiment shown in FIG. 1, the stator vanes 24 of the stator assembly 22 project radially outwardly from an inner circumferential wall 28 to the annular duct wall 14. The inner circumferential wall 28 can be directly mounted to the combustor (not shown), or coupled to the combustor through intervening components, to form a portion of the mainstream hot gas flow path 16 with the annular duct wall 14. The rotor blades 20 of the turbine rotor assembly 26 project radially outward from a turbine rotor platform 32 that is coupled to a turbine disk 34, which in turn circumscribes a shaft (not shown). Particularly, the rotor blades 20 transition into the platform 32 with fillets 58. The combustion gases 18 drive the rotor blades 20 and the associated turbine rotor assembly 26 for power extraction. Other embodiments may be differently arranged.

A gap 36 exists between the stator assembly 22 and the turbine rotor assembly 26. The gap 36 suitably transitions into a turbine disk cavity 38 that is formed upstream of the turbine disk 34. In the depicted exemplary embodiment, the gap 36 is defined by a stationary discourager 42 extending downstream from the inner circumferential wall 28 and a turbine discourager 44 extending upstream from the turbine disk 34. Cavity purge air 46 is obtained as bleed flow from a compressor or compressor stage (not shown) and is routed to the turbine disk cavity 38 to purge and to assist in maintaining a normal steady state temperature of the components surrounding the turbine disk cavity 38. The cavity purge air 46 additionally flows out of the gap 36 to provide a cooling film 48 to protect the platform 32 from the extreme temperatures of the combustion gases 18.

As additionally shown in FIG. 1, vortex suppression holes 54 are provided on a leading edge 50 of the rotor blade 20 and platform cooling replenishment holes 56 are provided on a pressure side 30 of the rotor blade 20. The vortex suppression holes 54 and platform cooling replenishment holes 56 are discussed in further detail below with reference to FIG. 3.

Figure 2:
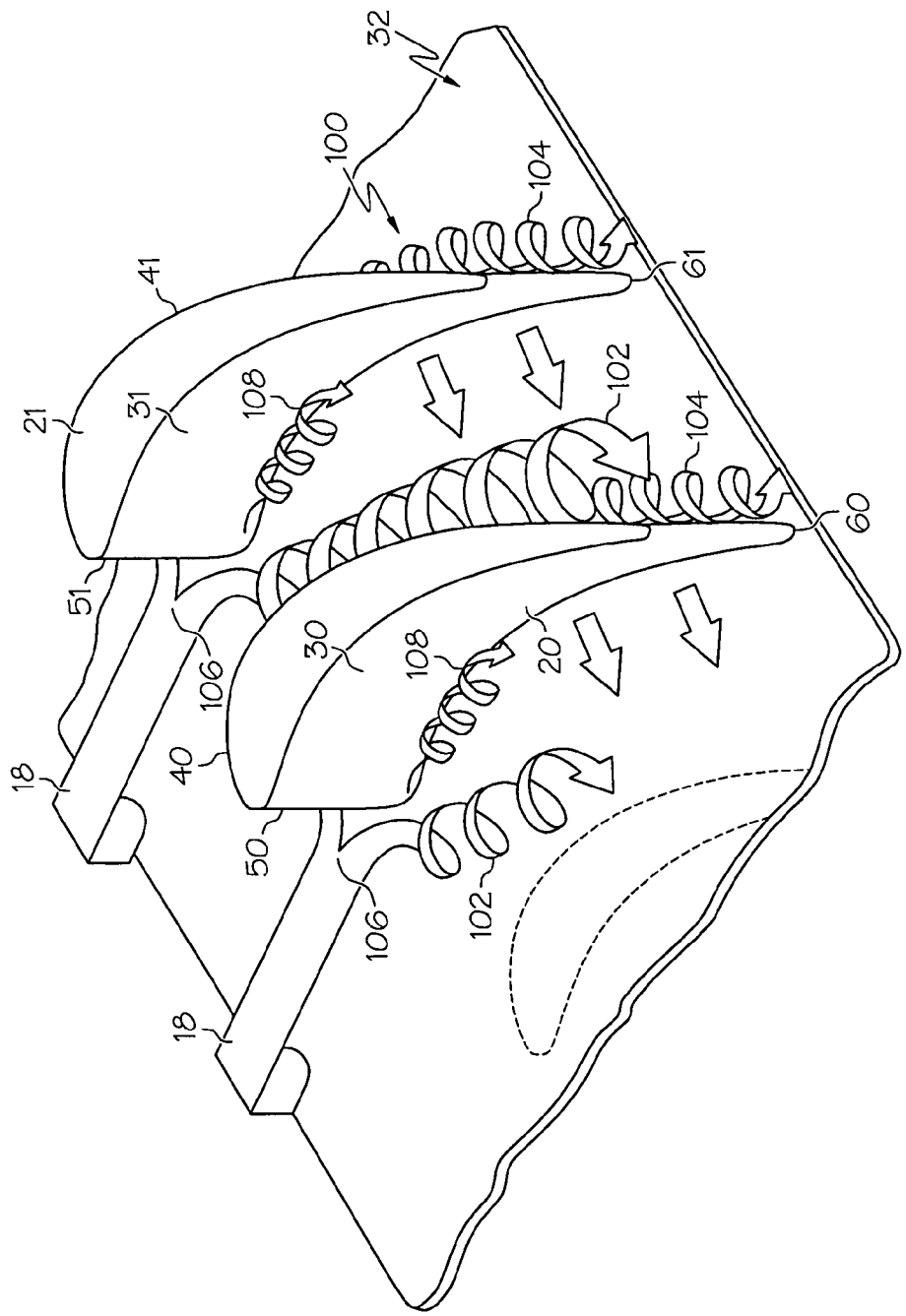
FIG. 2 shows an exemplary schematic representation of vortices formed between adjacent rotor blades in a portion of the gas turbine engine assembly of FIG. 1.

FIG. 2 is an isometric view of two adjacent rotor blades (such as rotor blade 20 and an adjacent rotor blade 21) and provides a schematic representation of the various vortices (generally referenced as 100) formed as the combustion gases 18 flow past the rotor blades 20, 21. Each rotor blade 20, 21 includes a generally concave pressure side 30, 31 and a circumferentially or laterally opposite, generally convex suction side 40, 41. The pressure side 30, 31 and suction side 40, 41 extend from a leading edge 50, 51 to a trailing edge 60, 61.

As the combustion gases 18 flow past the leading edges 50, 51 of the rotor blades 20, 21, they break into horseshoe vortices 102, 104, including pressure side vortices 102 and suction side vortices 104, that respectively flow axially downstream through the flow passages along the pressure sides 30, 31 and suction sides 40, 41 of the rotor blades 20, 21. The horseshoe vortices 102, 104 can split from one another at the leading edge 50, 51 of the respective rotor blade 20, 21 at a vortex formation area 106. The pressure side horseshoe vortex 102 will typically break away from the pressure side 30, 31 of the respective rotor blade 20, 21 and sweep circumferentially downstream to the adjacent suction side 40, 41. A corner vortex 108 typically forms on the pressure side 30, 31 of the rotor blade 20, 21 in the area vacated by the pressure side horseshoe vortex 102. Unchecked, the vortices 100 tend to create turbulence, result in total pressure losses, and reduce turbine efficiency. These vortices 100 may also detrimentally affect the thermal management of the various components of the engine assembly if not properly addressed, which is discussed in further detail below.

Figure 3:
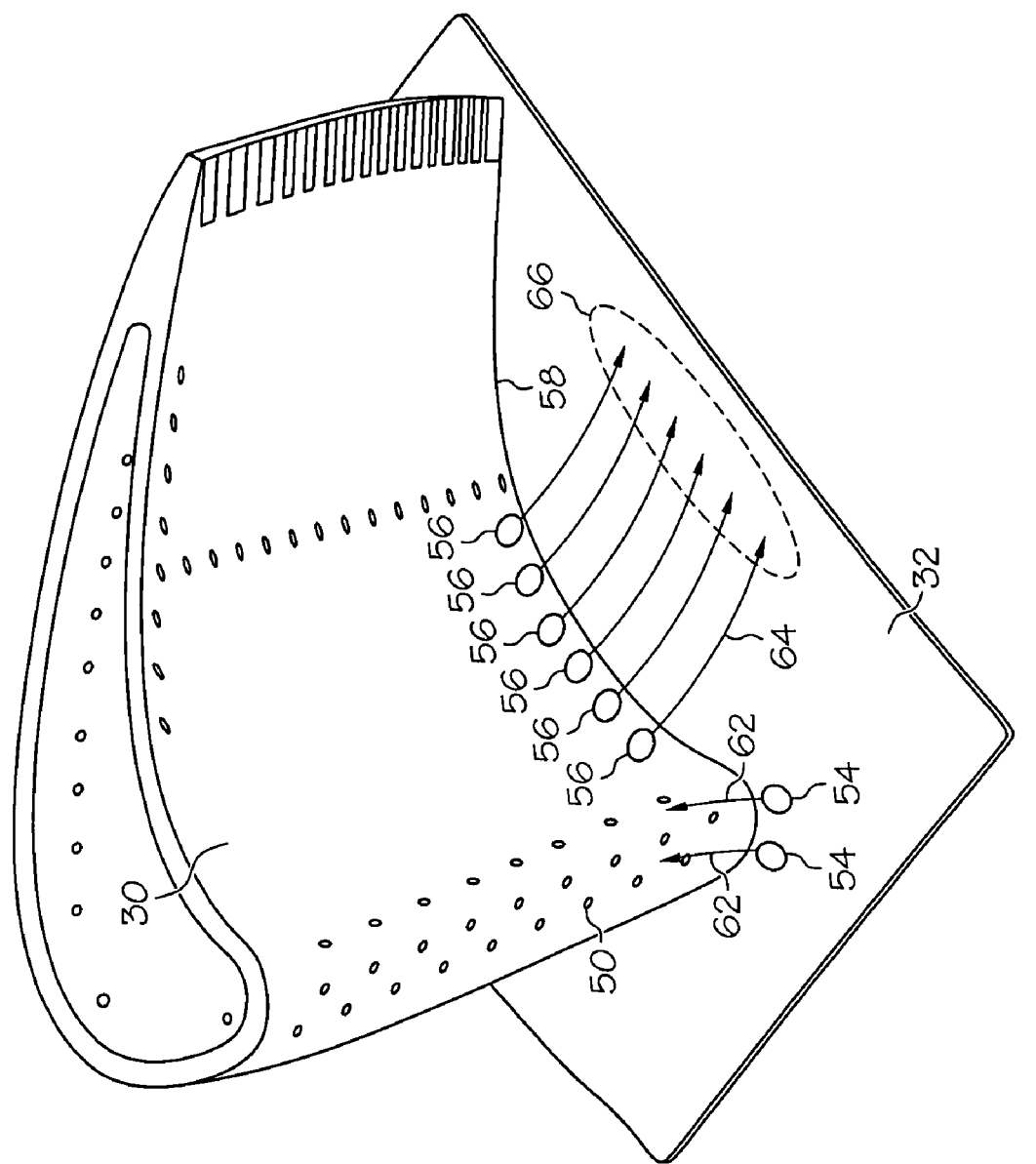
FIG. 3 is a leading edge, pressure side isometric view of a portion of the gas turbine engine assembly of FIG. 1.

FIG. 3 is an isometric view of a portion of the gas turbine engine assembly 10 that particularly illustrates the leading edge 50 and the pressure side 30 of the exemplary rotor blade 20 shown in FIG. 1. As noted above, one or more vortex suppression holes 54 are provided on the platform 32 adjacent the leading edge 50 of the rotor blade 20. The vortex suppression holes 54 extend through the platform 32 and function to exhaust jets 62 of cooling air bled from a compressor or other source. In such embodiments, the vortex suppression holes 54 can be oriented such that jets 62 flow radially outward at the leading edge 50, although other angles and directions are possible. Referring additionally to FIG. 2, the jets 62 can be directed to strike the combustion gases 18 at the area 106 where horseshoe vortices 102, 104 would be expected to form to interfere with the formation thereof. This interference may reduce the size of the horseshoe vortices 102, 104, which in turn would reduce turbulence and other undesirable effects. Smaller pressure side and suction side horseshoe vortices 102, 104 reduce aerodynamic losses and improve the cooling effectiveness of other cooling mechanisms.

In the illustrated embodiment, the vortex suppression holes 54 are positioned directly in front of the leading edge 50 on the platform 32 to exhaust jets 62 in a directly radial direction. In another embodiment, the vortex suppression holes 54 are positioned, for example, on the leading edge 50 and/or at an angle. Generally, the vortex suppression holes 54 are provided at any suitable angle and position such that the jets 62 strike directly at or near the formation area 106 to inhibit or suppress vortex formation. As shown, the vortex suppression holes 54 include two holes, although any suitable number can be provided. An exemplary diameter of each vortex suppression hole 54 can be, for example, 0.012 to 0.035 inch diameter jets, with 0.020 inch being the most common. Other diameters can also be provided. In one embodiment, the holes 54 would typically be no greater than one diameter away from the intersection of a leading edge fillet and the platform 32 and could be as close to the leading edge 50 as midway of the leading edge fillet. The position, number, orientation, and diameter of the vortex suppression holes 54 can be optimized using computation fluid dynamics (CFD).

As also discussed above, a row of platform cooling replenishment holes 56 are provided on the pressure side 30 of the rotor blade 20. The platform cooling replenishment holes 56 are shown in FIG. 3 as being located above the fillet 58 and are arranged in a generally straight line in the chord-wise direction, although other configurations are possible. The fillet 58 may be at least one of a constant radius fillet and a compound radius fillet. The platform cooling replenishment holes 56 exhaust jets 64 of cooling air bled from a compressor or other source, which may be entrained in the corner vortices 108 (FIG. 2) and swept downward onto the platform 32. These jets 64 function to provide a cooling film 66 on the platform 32. This cooling film 66 may also serve to replenish and/or augment the cooling film 48 (FIG. 1) from the cavity purge air 46 (FIG. 1). As such, the cooling film 66 protects the platform 32 from the elevated temperatures of the combustion gases 18 and mitigates any cooling film 48 dissipation resulting from the turbulence of the vortices 100 (FIG. 2). In effect, the jets 64 of the platform cooling replenishment holes 56 take advantage of the corner vortices 108 to enhance thermal characteristics.

The platform cooling replenishment holes 56 are typically at a height to ensure entrainment of the jets 64 with the corner vortices 108, the exact location of which can be determined with CFD. Although six platform cooling replenishment holes 56 are shown, in FIGS. 1 and 3, any number can be provided. Generally, at least two platform cooling replenishment holes 56 are advantageous. An exemplary diameter of each platform cooling replenishment holes 56 can be typically 0.015-0.035 inch diameter holes with 0.020 inch being most common. In one embodiment, the orientation of the replenishment holes 56 can vary between perpendicular to the surface to an angle of 30° from the surface pointing in the general direction of flow, although other orientations may be possible. CFD analyses may be performed to identify a preferred radial inward angle to optimize platform film cooling characteristics of the replenishment holes 56. Arrangements other than a straight line of platform cooling replenishment holes 56 can be provided, as desired. The platform cooling replenishment holes 56 can be evenly spaced, as shown, or more concentrated in areas in which more cooling flow is desired. The jets 64 from the platform cooling replenishment holes 56 enjoy an enhanced attachment to the outer surface of the platform 32 as a result of the entrainment with the corner vortex 108. This successfully reduces mixing losses with the combustion gases 18 flowable thereover during operation. Typically, additional cooling holes directly in the platform are not necessary.

Accordingly, the vortex suppression holes 54 and platform cooling replenishment holes 56 offer benefits in aerodynamic performance, thermal management, stress, and manufacturing. Particularly, the vortex suppression holes 54 and platform cooling replenishment holes 56 address the issues associated with vortices 100 that form as the combustion gases 18 flow through the rotor blades 20 of the turbine. The vortex suppression holes 54 and platform cooling replenishment holes 56 may be manufactured with standard methods known to those skilled in the art. Typical methods include casting the holes, drilling, electro-discharge machining (EDM), and laser drilling.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine assembly with combustion gases flowing through a gas flow path, the gas turbine engine assembly comprising:
   a stator assembly comprising a stator vane that extends into the gas flow path; and
   a turbine rotor assembly downstream of the stator assembly and comprising a turbine platform and a turbine rotor blade extending from the turbine platform into the mainstream combustion gases flow path, the turbine rotor blade comprising a pressure side and a suction side opposing the pressure side that extend from a leading edge to a trailing edge, the combustion gases forming horseshoe vortices at a formation area adjacent the leading edge of the turbine rotor blade, wherein the turbine rotor assembly further comprising a first set of holes in the turbine platform for directing first jets into the formation area of the horseshoe vortices.

2. The gas turbine assembly of claim 1, wherein the first set of holes is configured such that the first jets inhibit the formation of the horseshoe vortices.

3. The gas turbine engine assembly of claim 1, wherein the first set of holes is positioned on the platform proximate to the leading edge of the turbine rotor blade.

4. The gas turbine engine assembly of claim 3, wherein the first set of holes is configured such that the first jets flow radially outward.

5. The gas turbine engine assembly of claim 1, wherein the first set of holes is located immediately upstream of the leading edge of the turbine rotor blade and is configured such that the first jets flow radially outward.

6. The gas turbine engine assembly of claim 1, further comprising a second set of holes configured such that second jets flow onto the turbine platform.

7. The gas turbine engine assembly of claim 6, wherein the combustion gases additionally form a corner vortex as one of the horseshoe vortices separate from the pressure side of the turbine rotor blade, and wherein the second set of holes is configured such that the second jets are entrained in the corner vortex.

8. The gas turbine engine assembly of claim 7, wherein the second set of holes is configured such that the second jets flow onto the turbine platform with the corner vortex to provide a cooling film.

9. The gas turbine engine assembly of claim 6, wherein the second set of holes include at least two holes arranged in a generally straight line in the chord-wise direction.

10. The gas turbine engine assembly of claim 6, wherein turbine blade transitions into the turbine platform with a fillet, the second set of holes being positioned above the fillet.

11. The gas turbine engine assembly of claim 10, wherein the fillet has at least one of a generally constant radius of curvature fillet and a compound radius of curvature fillet.

12. A gas turbine engine assembly with combustion gases flowing through a gas flow path, the gas turbine engine assembly comprising:

a stator assembly comprising a stator vane that extends into a mainstream combustion gases flow path; and a turbine rotor assembly downstream of the stator assembly and comprising a turbine platform and a turbine rotor blade extending from the turbine platform into the mainstream combustion gases flow path, the turbine rotor blade comprising a pressure side and a suction side opposing the pressure side that extend from a leading edge to a trailing edge, the combustion gases forming horseshoe vortices at a formation area adjacent the leading edge of the turbine blade and a corner vortex along the pressure side of the rotor blade, wherein the turbine rotor assembly comprising a first set of holes positioned on the pressure side of the rotor blade configured such that first jets of cooling air flow onto the turbine platform.

13. The gas turbine engine assembly of claim 12, wherein the first set of holes is configured such that the first jets are entrained in the corner vortex.

14. The gas turbine engine assembly of claim 12, wherein the first set of holes is configured such that the first jets flow onto the turbine platform with the corner vortex to provide a cooling film.

15. The gas turbine engine assembly of claim 12, wherein the first set of holes includes at least two holes arranged in a generally straight line in the chord-wise direction.

16. The gas turbine engine assembly of claim 12, wherein turbine rotor blade transitions into the turbine platform with a fillet, the first set of holes being positioned above the fillet.

17. The gas turbine engine assembly of claim 12, the turbine rotor assembly further including a second set of holes configured to direct second jets into the formation area of the horseshoe vortices such that the formation of the horseshoe vortices is inhibited.

18. The gas turbine engine assembly of claim 12, wherein the first set of holes is positioned on the platform proximate to the leading edge of the turbine blade.

* * * * *